(12) United States Patent
Brazier

(10) Patent No.: US 12,384,474 B2
(45) Date of Patent: Aug. 12, 2025

(54) TRACK ASSEMBLY WITH IDLER WHEEL VIBRATION DAMPENING ROCKER SUSPENSION SUPPORTS

(71) Applicant: Glen Brazier, Karlstad, MN (US)

(72) Inventor: Glen Brazier, Karlstad, MN (US)

( * ) Notice: Subject to any disclaimer, the term of this patent is extended or adjusted under 35 U.S.C. 154(b) by 278 days.

(21) Appl. No.: 17/300,057

(22) Filed: Feb. 25, 2021

(65) Prior Publication Data

US 2022/0266930 A1    Aug. 25, 2022

(51) Int. Cl.
*B62D 55/108* (2006.01)
*B62D 55/15* (2006.01)

(52) U.S. Cl.
CPC ......... *B62D 55/1086* (2013.01); *B62D 55/15* (2013.01)

(58) Field of Classification Search
CPC ..... B62D 55/14; B62D 55/15; B62D 55/1086
See application file for complete search history.

(56) References Cited

U.S. PATENT DOCUMENTS

| | | | | |
|---|---|---|---|---|
| 1,388,750 A * | 8/1921 | Palmer | ................... | B62D 55/04 305/132 |
| 1,513,144 A * | 10/1924 | Wellman | ................ | B62D 55/08 305/134 |
| 1,579,245 A * | 4/1926 | Pennington | .......... | B62D 55/108 474/134 |
| 3,826,325 A * | 7/1974 | Purcell | ................. | B62D 55/116 180/9.1 |
| 6,247,547 B1 * | 6/2001 | Lemke | ................... | B62D 55/10 305/132 |
| 6,951,260 B1 * | 10/2005 | Isley | .................... | B62D 55/104 280/681 |
| 8,302,710 B2 * | 11/2012 | Allaire | ................. | B62D 55/104 280/124.135 |
| 2007/0181351 A1 * | 8/2007 | Brazier | .................. | B62D 55/04 180/9.54 |
| 2008/0196947 A1 * | 8/2008 | Brazier | ................ | B60G 21/045 180/9.5 |
| 2008/0211298 A1 * | 9/2008 | Poirier | .................. | B62D 55/14 305/130 |
| 2017/0210434 A1 * | 7/2017 | Brazier | ................ | B62D 55/104 |

* cited by examiner

*Primary Examiner* — Kip T Kotter
(74) *Attorney, Agent, or Firm* — Douglas L Tschida

(57) ABSTRACT

An endless track assembly that mounts to a vehicle drive linkage. The track assembly includes a belted track, drive sprocket, framework and sets of ramp/road and idler/road wheels that support interior track surfaces. Idler axles are secured fore and aft of co-planar pivot members at rocker assemblies laterally interleaved between suspended idler/road wheels laterally spanning the framework. Each rocker assembly supports an elastomer cushion on a rocker plate that pivots in a housing between opposed wear plates to compress and expand and resist pivoting rocker plate movements.

13 Claims, 6 Drawing Sheets

TRACK ASSEMBLY WITH IDLER WHEEL VIBRATION DAMPENING ROCKER SUSPENSION SUPPORTS

BACKGROUND OF THE INVENTION

The present invention relates to tracked vehicles and, in particular, to a shape changing track assembly wherein fore and aft ramp/road wheel axles each support a plurality of laterally separated ramp wheels, wherein a plurality of idler/road wheel axles are mounted to a plurality of laminated rocker arm assemblies and coupled to rocker plates mounted to pivot relative to a supporting framework, wherein the idler/road wheel axles and rocker plate pivots are supported in the same plane, and wherein each rocker assembly includes an elastomer resistance pad such that movements of the idler/road wheels with changing terrain conditions are resiliently resisted to maintain a conformal track to ground contact.

A wide variety of personal and commercial all terrain vehicles have been developed for travel over off-road terrain such as desert, tundra, river beds, sodden fields and other unfriendly surface conditions including mud, sand, rocks, timber etc. These vehicles typically support at least one pair of track assemblies from a chassis mounted suspension. Some of the track assemblies permit conversion of wheeled vehicles to track vehicles.

Of the latter type of track assemblies, some also provide for pivoting idler wheel supports that follow changes in terrain contours and control and counter-act track flexion. U.S. Pat. Nos. 6,904,986; 7,131,508; 7,533,741; and 7,597,161 disclose track assemblies of the foregoing types.

The foregoing assemblies and others commonly support the idler/road wheels from elastomer encapsulated axles. That is, the axles are bedded or encapsulated in a concentric elastomer and surrounding steel bushing and supported by the axle bore, pillow block or the like. As the track moves over the terrain and flexes multi-directionally, the track support wheels move horizontally, rise, fall and pivot with the track as determined by the track suspension. Bedding the axles in an elastomer bushing permits axle movement to facilitate track flexion. Axle movement is however limited by the thickness of the elastomer bedding and concentric relationship.

The idler/road wheels may also be mounted to a rocker-type suspension secured to a track framework to permit further movement of the idler/road wheels to accommodate terrain changes. Rocker-type suspensions most typically provide pivot member(s) positioned above a horizontal plane containing the idler/road wheel axles. Such overlying mountings enhance the range of idler/road wheel movement but also increase the height of the overall track assembly.

In contrast, the present idler/road wheel suspension assembly seeks to reduce or minimize the overall height of a track assembly with comparable idler/road wheel flexion movement, while maximizing the track assembly's load capacity. An improved compact or "reduced height" rocker suspension is therefore disclosed which accommodates comparable load capacity to existing "high pivot" track assemblies and with improved ride comfort.

SUMMARY OF THE INVENTION

It is a primary object of the invention to provide an all terrain vehicle with an improved rocker-type idler/road wheel suspension for a supporting track assembly.

It is further object of the invention to provide a track assembly wherein a track framework supports a plurality of rocker arms or plates having multiple idler/road wheels mounted to idler axles located fore and aft of rocker plate pivot members and wherein the pivot members are positioned to lie in the same horizontal plane containing the idler axles and included idler/road wheels.

It is further object of the invention to provide a drive track assembly wherein a track framework supports a plurality of longitudinally extending rocker plates from a plurality of pivot members, wherein each rocker plate supports at least one idler axle and each idler axle supports a plurality of laterally separated idler/road wheels.

It is further object of the invention to provide a drive track assembly of the foregoing type wherein each pivot member is contained in the same horizontal plane as the idler axles.

It is further object of the invention to provide a drive track assembly having a plurality of idler axles containing a plurality of idler/road wheels, wherein the idler axles and supported from a plurality of rocker plates mounted to pivot at a plurality of rocker assemblies laterally interspersed between the idler/road wheels and secured to the framework, wherein each rocker assembly includes an elastomer cushion laminated between wear plates and coupled to the moveable rocker plate such that up/down movement of the idler/road wheels and responsive pivoting movement of the rocker plates is opposed by the compression/expansion of the elastomer cushions.

It is further object of the invention to provide a drive track assembly having a plurality of idler axles containing a plurality of idler/road wheels and supported from a plurality of rocker assemblies, wherein one or more pivot members of each rocker assembly is positioned in the same horizontal plane as the idler axle of each idler/road wheel, wherein each rocker assembly includes an elastomer cushion laminated between wear plates secured to a rocker plate and wherein up/down movement of the idler/road wheels and responsive pivoting movement of the rocker plate is opposed by the compression/expansion of the elastomer cushion.

The present invention was developed to provide an improved track conversion assembly for a variety of vehicles accommodative of a relatively low-profile track assembly having a similar load capacity as prior art "high pivot" rocker arm track assemblies and providing an improved, smoother vehicle ride. The track assembly provides multiple idler axles containing sets of laterally separated idler/road wheels secured to rotate about each axle. An increased number of relatively small diameter idler/road wheels distributes the load weight over a larger load bearing footprint of the supported the track.

The idler axles of the idler/road wheels are mounted fore and aft and coplanar with a plurality of pivot members supported in longitudinally extending rocker assemblies secured to the track framework. Each rocker assembly includes an elastomer cushion laminated between wear plates secured to a rocker plate. Up/down movement of the idler/road wheels and responsive pivoting movement of the rocker plates is opposed by the compression/expansion of the elastomer cushions.

The placement of the pivot axis of each rocker plate reduces the vertical profile of the track assembly. An increased number of laterally separated idler/road wheels maintains the load capacity of the track assembly. Elastomer bedded axle bearings and the compression and expansion of the elastomer cushions at the rocker plates resiliently resist movements of the idler axles and idler/road wheels to conform the track to the terrain and provide a relatively smooth vehicle ride. The subject "low-pivot" track assembly finds particular application for trucks and other multi-axle vehicles and equipment that transport heavy loads.

The foregoing objects, advantages and distinctions of the invention are obtained in a track assembly disclosed and discussed below. Still other objects, advantages, distinctions, constructions and combinations of individual features of the invention will become more apparent from the following description with respect to the appended drawings. Similar components, assemblies and sub-assemblies are referred to in the various drawings with similar alphanumeric reference characters. The description to each feature and/or combination should therefore not be literally construed in limitation of the invention. Rather, the invention should be interpreted within the broad scope of the further appended claims.

BRIEF DESCRIPTION OF THE PREFERRED EMBODIMENT

Figure 1:
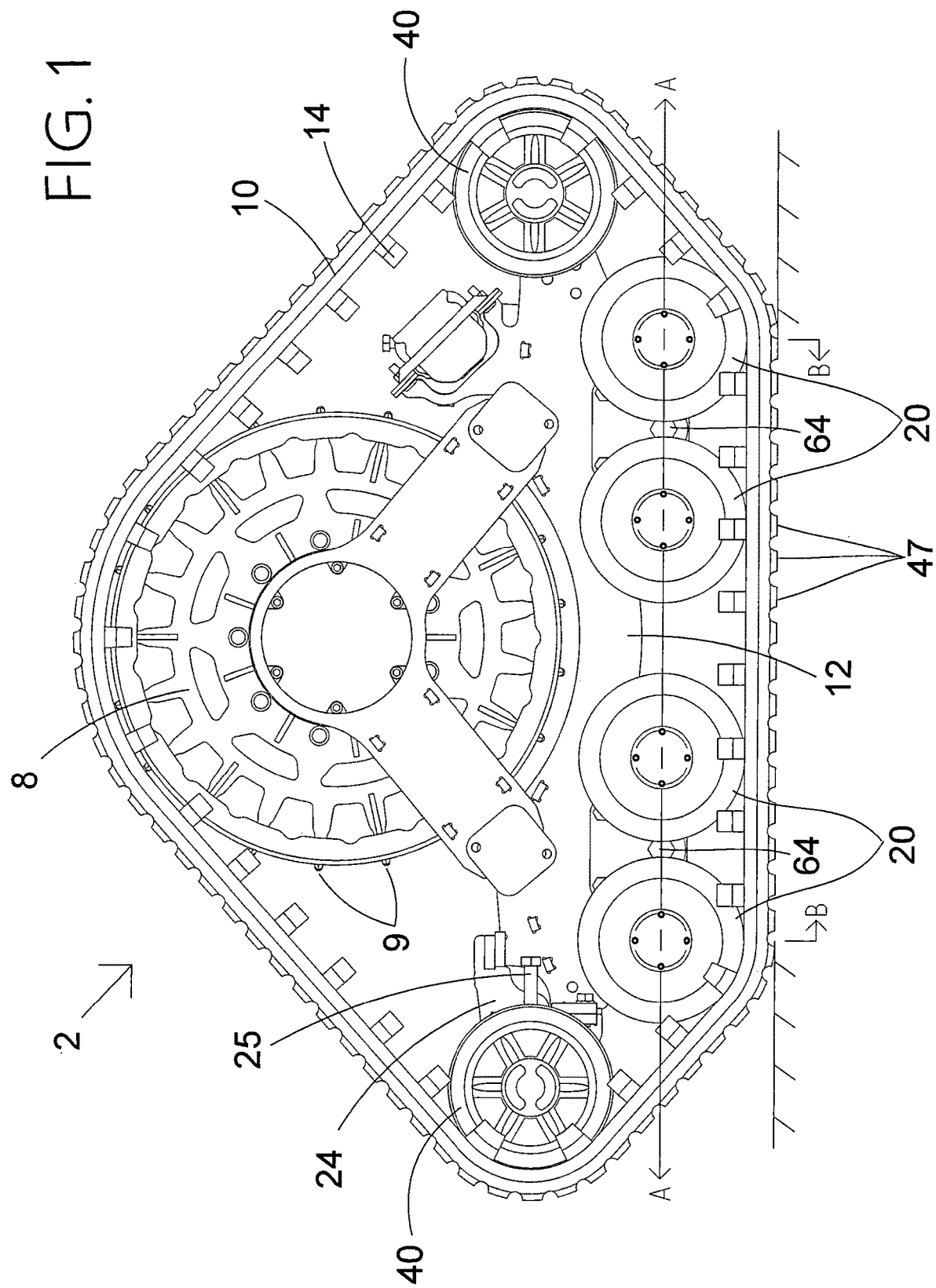
FIG. 1 is a plan drawing showing a front view of a track assembly of the invention including a plurality of laterally separated idler/road wheels mounted to rotate about idler axles secured to longitudinally extending, laminated triangular-shaped rocker assemblies. The rocker assemblies are laterally interspersed between adjoining idler/road wheels. The idler axles are supported in the same plane as a pivot axis defined by a pivot member of each rocker assembly. Each rocker assembly includes an elastomer cushion mounted to resiliently resist pivoting movements of a rocker plate of each rocker assembly to maintain wheel to track and track to terrain contact.

With attention to FIG. 1 a drive track assembly 2 is shown. The drive track assembly 2 is typically secured to an axle that extends from a supported vehicle (not shown). The axle can be powered or passive. The supported vehicle can be configured to any desired construction or configuration. The subject drive track assembly 2 can be combined with other drive track assemblies secured to a vehicle to appropriately distribute loading and accommodate steering.

A pair of drive track assemblies 2 are typically actively powered via driven axles extending from a passenger compartmented vehicle and coupled to a drive sprocket 8 at the track assembly 2. In some circumstances and/or depending upon the vehicle or equipment type, the drive track assembly 2 can be mounted to passively rotate as the track assembly 2 distributes the vehicle's weight over uneven terrain. The drive track assembly 2 is designed to mount and replace conventional wheels that are normally secured to vehicle axles.

The chassis (e.g. passenger, storage and cargo compartments) of the vehicle can be configured to any desired form and shape. Passenger, equipment supports or cargo storage platforms or compartments can be included and/or configured on vehicle support frame members as desired to accommodate any desired load, whether for personnel and/or cargo or equipment transport. An associated drive suspension (not shown) can be configured as desired with an appropriately sized engine and drive linkage(s) and/or axles coupled to the track assembly(s) 2.

The active and/or passive track assembly 2 can be mounted to steer or passively follow the supported vehicle. The track assembly 2 mounts to couplers and/or linkages that extend between the track assembly 2 and the vehicle axle and vehicle and track assembly frame. Presently preferred linkages are described below. For a driven track assembly 2, drive power is supplied to each track assembly 2 via an appropriate drive linkage (not shown) coupled to the track framework and particularly a drive sprocket 8 at the assembly 2. Drive power can be provided from a gas or diesel engine, suitable DC electric motors or combinations thereof.

Track assemblies 2 fitted for vehicle steering typically exhibit a relatively short longitudinal length and load bearing footprint such as shown at FIG. 1. The track assembly 2 includes a drive track 10 that is supported from the drive sprocket 8 and a framework 12. The framework 12 can be constructed of cast or plate metals that are cut, formed and/or welded to a preferred configuration. Whether or not actively powered, the drive sprocket 8 rotates to drive the track 10 as drive lugs 14, depressions or other suitable appendages or holes at the interior surface of the track 10 are contacted by suitable drive teeth or lugs 9 at the drive sprocket 8. The drive sprocket 8 is presently supported to couple to drive lugs 14 that project from and span an interior surface of the track 10.

A series of idler axles 16 are fitted to the track framework 12. The idler axles 16 laterally span the framework 12 and support laterally displaced sets of idler/road wheels 20 that are aligned to engage interior longitudinal channels between the interspersed drive lugs 14. Each idler axle 16 extends through an elastomer bedded bearing (e.g. roller bearing) mounted behind the bearing cap 13 mounted in the center of each idler/road wheel 20. Flat surfaces 17 are provided along the length of each idler axle 16 and the purpose of which is described below. Shouldered surfaces are provided at the ends of the idler axles 16 and abut the bearings of the idler/road wheels 20.

Extending from the forward and aft ends of the framework 12 are paired sets of ramp/road wheels 40. The ramp/road wheels 40 are mounted to ramp axles 15 that span the framework 12 and align with the longitudinal channels in the track 10 and the idler/road wheels 20 that travel in the same channels.

The forward ramp/road wheels 40 mount to a reciprocating, length extensible/retractable tensioner assembly 24 mounted to the framework 12. An adjustable linkage secured between the ramp axles 15 and framework 12 is located to extended and retract the ramp/road wheels 40 relative to the framework 12 to control the tension on the track 10. The ramp/road wheels 40 mounted to an aft end of the framework 12 are not presently extensible, although could also be mounted to extend and retract.

The tensioner 24 is secured in sliding cooperation with the fore-end of the framework 12 and can be extended and retracted via threaded adjusters 25. A variety of alternative longitudinally adjustable linkages can be adapted to provide a desired reciprocating movement of the tensioner 24 to establish track tension.

In some track assembly constructions, the drive sprocket 8 can be mounted to permit an eccentric adjustment of is rotational center relative to the vehicle to vary track tension. Such a mounting assembly provides an adjustment that stretches/relaxes the drive track 10 relative to the drive sprocket 8. For example, the drive sprocket 8 can mount to an eccentric bearing having a transverse axle bore located off center. Upon fitting the bearing to a sprocket support axle extending from the vehicle, the eccentric bearing and sprocket 8 can be rotated about the vehicle axle to adjust the mounting location of the sprocket 8 in an eccentric, cam lobe-like rotating action relative to the track support framework 12. The eccentric rotation varies the track tension. Upon fixing the bearing position relative to the sprocket 8 and framework 12, the sprocket 8 rotates in normal fashion about the vehicle axle.

The diameter of the idler/road wheels 20 and fore and aft ramp/road wheels 40 can be selected as desired. Presently for the track assembly 2 of FIG. 1, the forward and aft ramp/road wheels 40 and idler/road wheels 20 all exhibit a diameter of 8 inches. For other track assemblies, the forward and aft ramp/road wheels typically are selected to be larger than the intermediate idler/road wheels 20.

The framework 12 is generally constructed as a box frame. The framework 12 comprises welded top, bottom and side plates 49 that are appropriately positioned to obtain desired support and strength. The idler/road axles 16 project from the side plates 49. The ramp axles 15 laterally span the forward and aft ends of the framework 12 to support the forward and aft ramp/road wheels 40. The position of the forward ramp axle 15 and supported ramp/road wheels 40 are again longitudinally adjustable via the tensioner 24.

Figure 2:
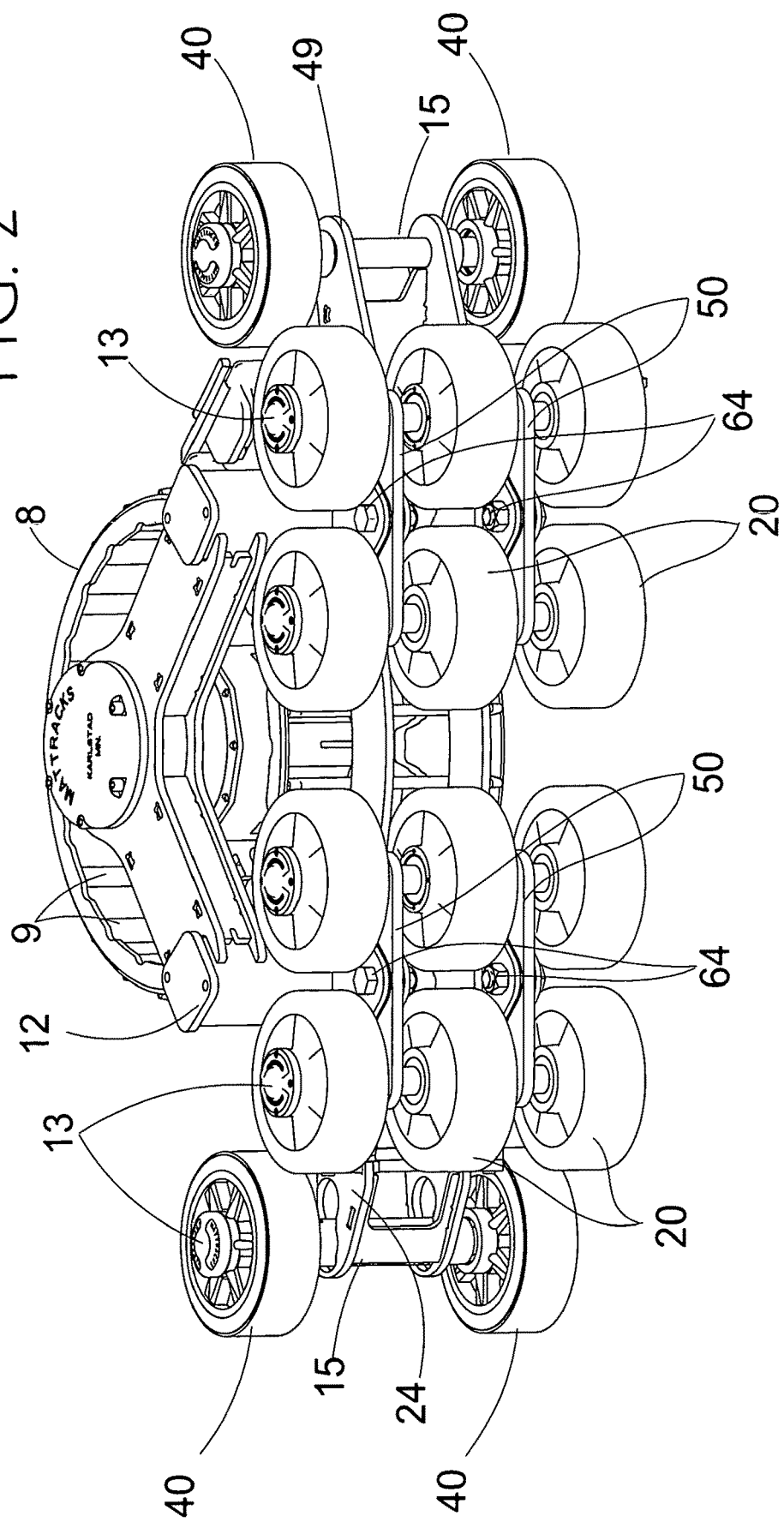
FIG. 2 is a perspective drawing showing the bottom and front of the track assembly and framework of FIG. 1 without the drive track.
Figure 3:
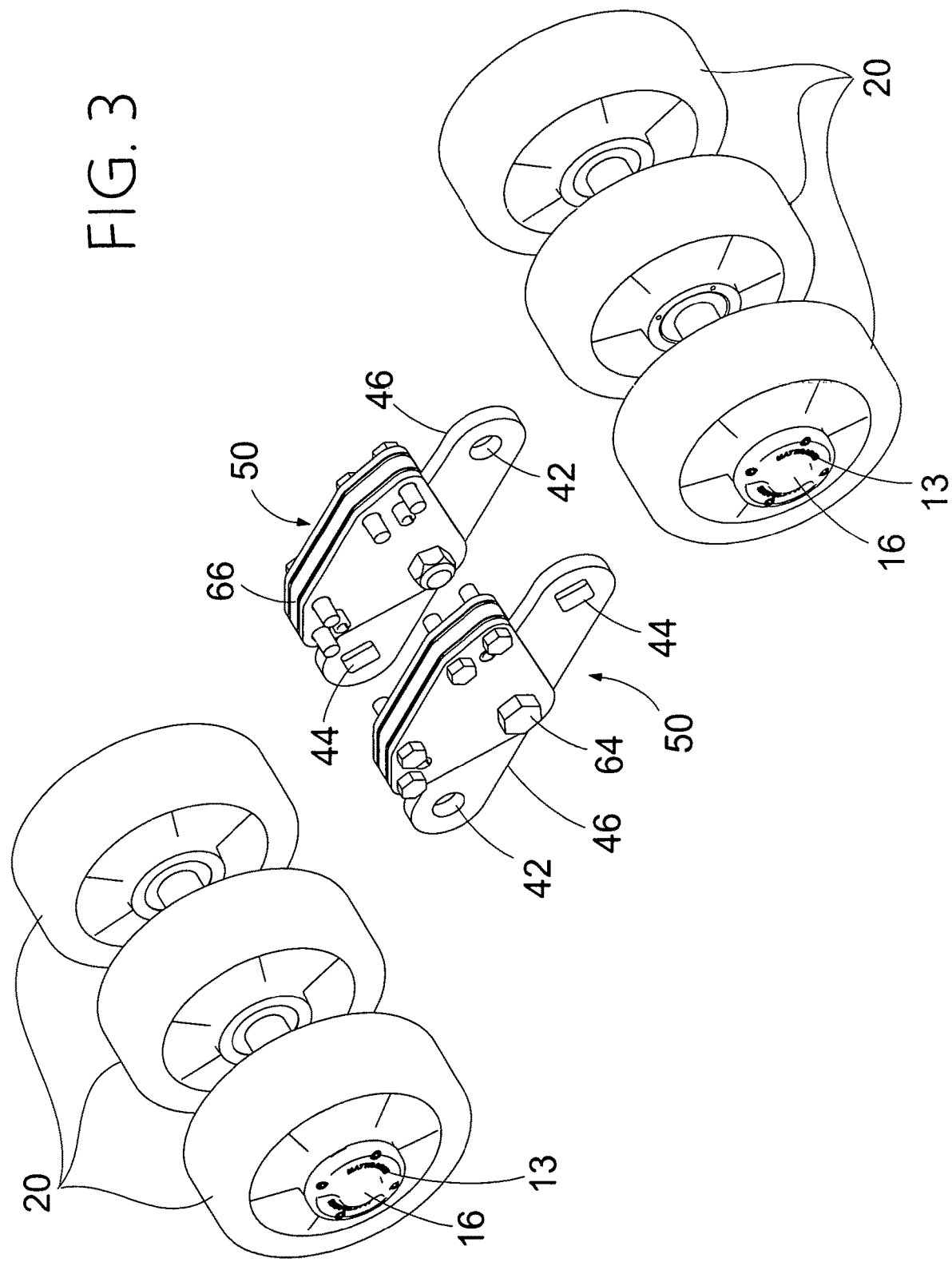
FIG. 3 shows a perspective drawing in exploded assembly of a pair of idler axles and laterally displaced sets of idler/road wheels that mount fore and aft of a pivot member at a rocker plate contained within a pair of intermediate rocker assemblies that support the idler/road wheels to a track framework.
Figure 4:
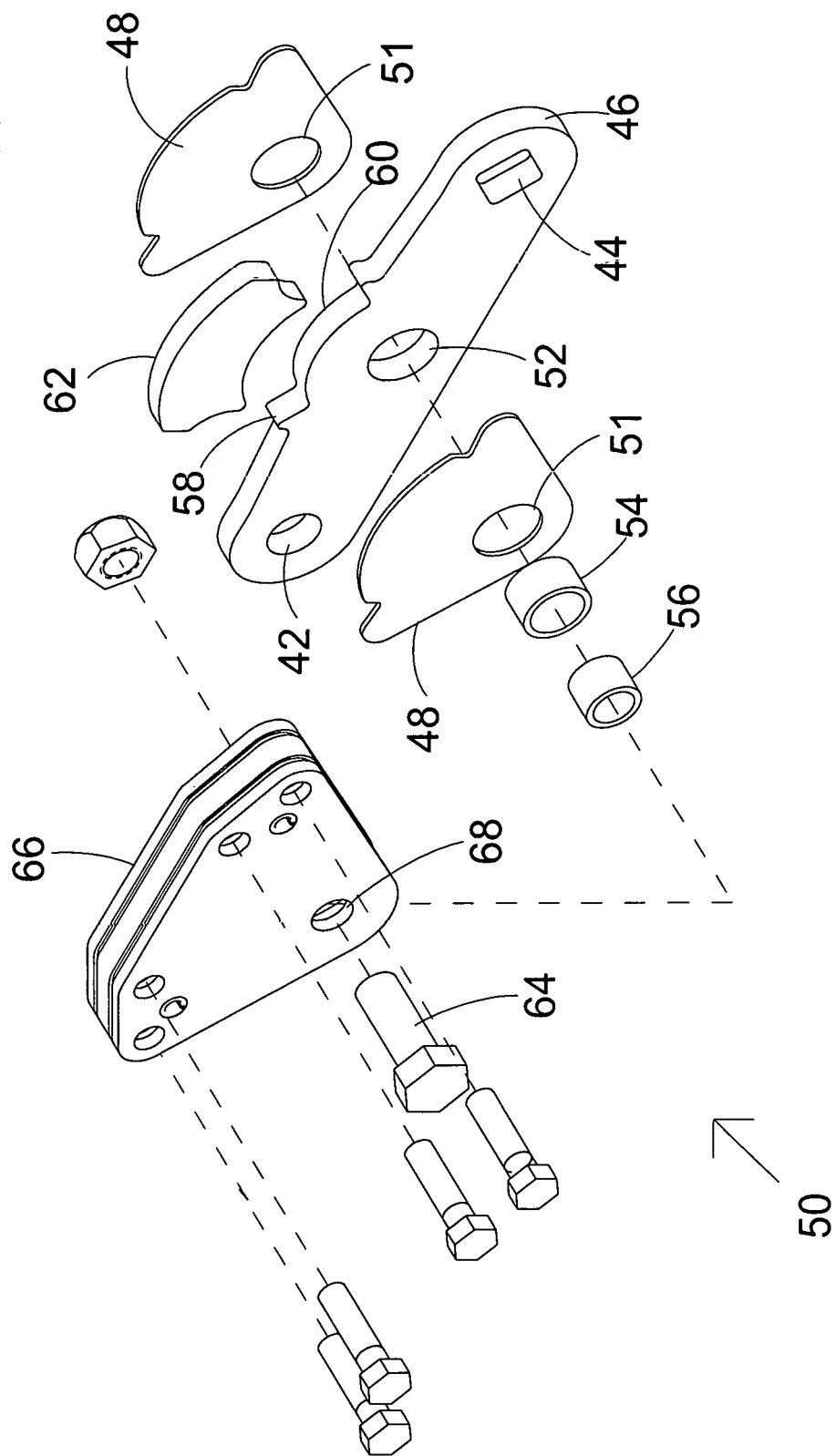
FIG. 4 shows a perspective drawing in exploded assembly of one of the pair of intermediate rocker assemblies of FIG. 3.
Figure 5:
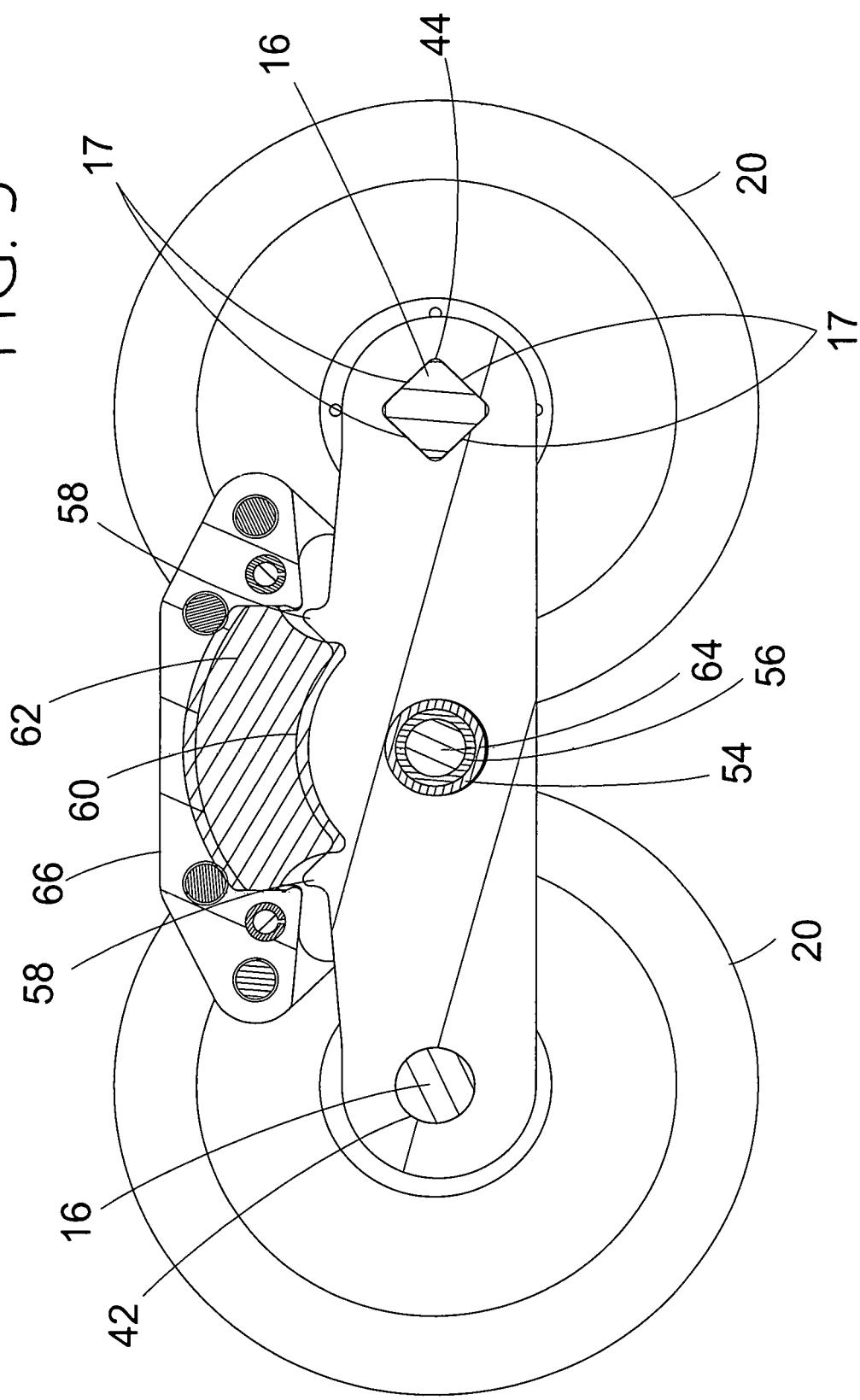
FIG. 5 shows a longitudinal cross section view of a rocker assembly supporting fore and aft idler axles containing multiple laterally displaced idler/road wheels and exposing an elastomer cushion and the co-planar orientation of the idler axles and rocker plate pivot members.
Figure 6:
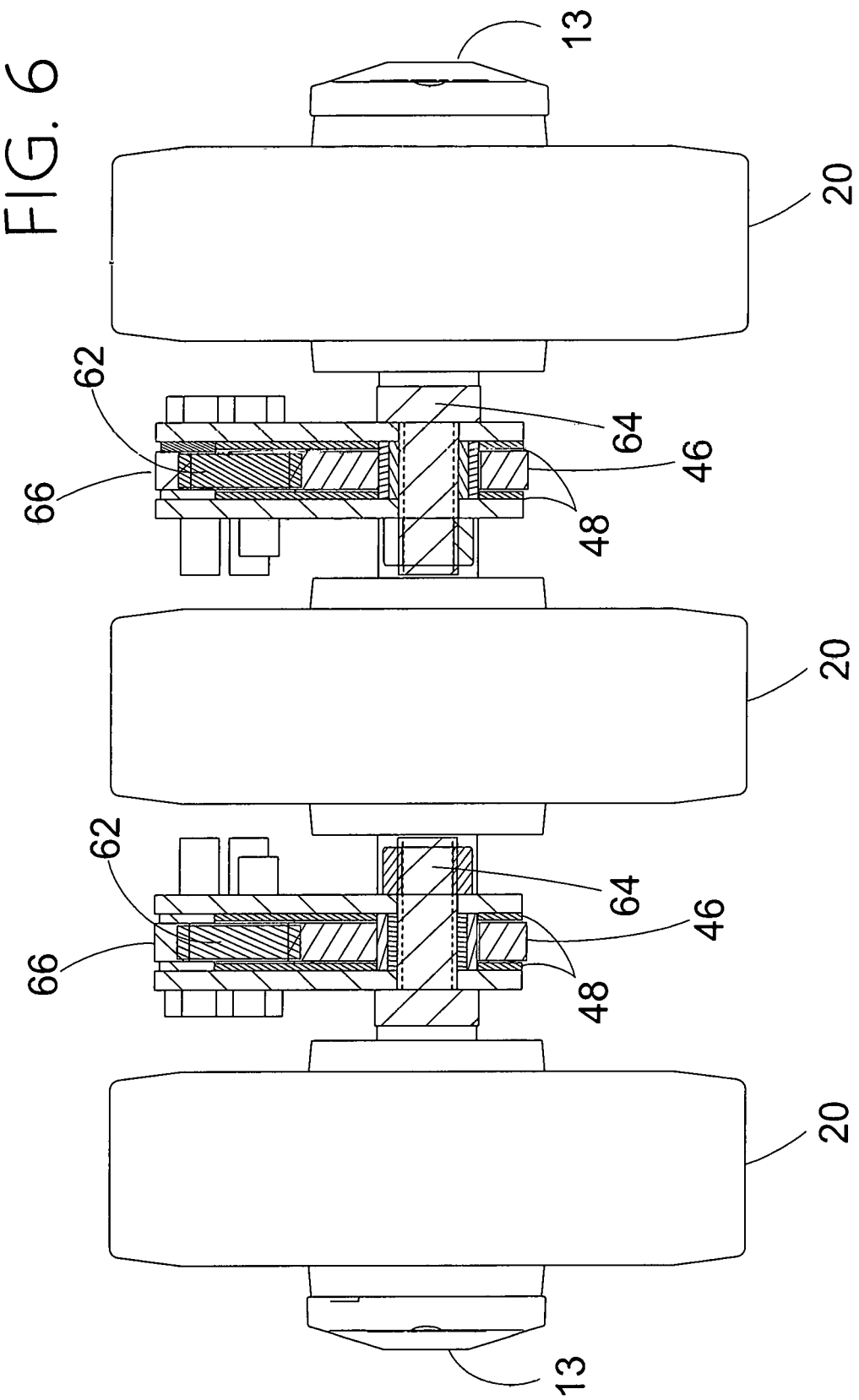
FIG. 6 shows an enlarged lateral cross section view of one to the idler axles, laterally separated idler/road wheels and interspersed supporting rocker assemblies securing the idler/road wheels to the framework.

With attention to FIGS. 3-6, the framework 12 supports the idler/road wheels 20 in seriatim intermediate the forward and aft ramp/road wheels 40. It is to be appreciated the idler/road axles 16 and idler/road wheels 20 can be longitudinally and laterally staggered in any desired symmetrical or non-symmetrical displaced configuration. Each idler/road wheel 20 is captured and suspended from the framework 12 from a number of rocker assemblies 50 which are depicted in detail at FIGS. 3-5 and shown in their typical mounted positions at FIGS. 2 and 6.

Presently, a pair of rocker assemblies 50 are laterally interleaved between laterally displaced idler/road wheels 20 supported from each pair of laterally adjoining idler axles 16 mounted to each rocker assembly 50. The idler axles 16 mount through circular and square bores 42 and 44 at a rocker plate 46 of each rocker assembly 50. Mounted on opposite sides of the rocker plate(s) 46 are wear plates 48. A pivot bore 51 at the wear plates 48 aligns with a bore 52 at the rocker plate 46. Mounted in concentric relation to the bores 51 and 52 is an outer nylon bushing 54 and an inner metal bushing 56.

Projecting from the upper surface of the rocker plate(s) 46 are bosses 58. The bosses extend above an intermediate arcuate surface 60 of the rocker plate(s) 46. Mounted between the bosses 58 and resting on the surface 60 is an elastomer cushion 62, exhibiting a shape similar to a brake pad. The cushion 62 is constructed to compress and expand as the rocker plate 46 pivots about a pivot member 64 fitted through the bores 51 and 52. The pivot member 64 also passes through a rocker housing 66 secured with suitable fasteners to the framework 12. The cushions 62 can be constructed of a variety of elastomer and/or compressible and expansible materials, composites and hybrid combinations provided they exhibit sufficient resiliency and durability to withstand the typical forces placed on the idler/road wheels 20 and idler axles 16.

Fitted over the rocker plate 46, wear plates 48 and cushion 62 of each rocker assembly 50 is the rocker housing 66. A bore 68 in the housing is aligned with the bores 51 and 52 and the pivot member 64 is passed through the aligned bores 51, 52 and 68. The rocker housing 66 otherwise is rigidly secured to the framework 12. The rocker plate 62 is thereby mounted to pivot from the rocker housing 66 and suitably pivot about the pivot member 64 relative to the framework 12. The wear plates 48 laterally support the cushion 62 and prevent undue wear as the cushion 62 compresses and expands as each rocker plate 62 pivots about its supporting pivot member 64.

The idler axles 16 extend below the framework 12 between a pair of laterally displaced rocker assemblies 50 interleaved between the idler/road wheels 20 and positioned adjacent the outer side plates 49 in a fashion that prevents the idler axles 16 from turning in the rocker assemblies 50. In particular, the square and round bores 44 and 42 of the adjoining rocker plates 46 are aligned such that flat surfaces 17 provided at each idler axle 16 are fitted into the square bores 44 and securely hold each idler axle 16 in fixed alignment with the rocker plate(s) 46.

The idler/road wheels 20 are thereby able to independently rotate within their center bearings, yet resiliently pivot, rise and fall to conform to changes in the terrain. The track 10 is thus able to resiliently conform to the terrain and maintain contact between the drive lugs 47 and terrain.

Moreover, and returning attention to FIG. 1, the idler axles 16 and pivot members 64 are co-planarly aligned in the same plane A-A which lies parallel to the bottom of the framework 12 and the bottom, contact surface or foot print B-B of the track 10 relative to the terrain. As noted above, such a mounting of the rocker assemblies 50 is unusual and reduces the vertical height profile and center of gravity of the track assembly 2. Typical prior art track assemblies provide rocker assemblies having pivots mounted above the idler/road wheels 16 to enhance the range of idler/road wheel motion. The collective effect of the present coplanar mounting of the idler axles 16 and pivot members 64 and reduced height suspension arrangement advantageously enables the track assembly 2 to exhibit a smoother ride characteristic with enhanced ride stability and without affecting the conformal movements of the track 10 versus prior art track assemblies.

While the invention is shown and described with respect to a presently considered track assembly and several considered improvements, modifications and/or alternatives thereto, still other assemblies and arrangements may be suggested to those skilled in the art. It is to be appreciated also that the features of the foregoing vehicles and track assemblies can be arranged in different combinations. The foregoing description should therefore be construed to include all those embodiments within the spirit and scope of the following claims.

What is claimed is:

1. A track assembly for a vehicle having a chassis, an engine and a plurality of axles, comprising:

a) a track having an interior surface from which a plurality of drive lugs project and an exterior surface from which a plurality of ground lugs project and including a surface region defining a footprint whereat the ground lugs engage the terrain;
b) a framework including a drive sprocket, a plurality of ramp wheels supported from a plurality of ramp axles at forwardmost and aftmost ends of the framework, a plurality of idler wheels supported from a plurality of idler axles laterally coupled to span said framework, wherein at least two of said plurality of idler wheels are displaced laterally along each of said plurality of idler axles; and
c) a plurality of rocker assemblies coupled to said framework including a plurality of rocker plates and a plurality of pivot members, wherein each rocker assembly includes one of said plurality of rocker plates, wherein at least one of said plurality of idler axles is mounted to the one of said plurality of rocker plates, wherein said plurality of pivot members and said plurality of idler axles are coplanar mounted in a plane and said plane parallels said footprint, wherein each of said plurality of rocker assemblies includes a housing containing an elastomer member, and wherein said elastomer member is captured within said housing to compress and expand with pivoting movements of the one of said rocker plates about one of said pivot members, whereby said plurality of rocker plates and said plurality of idler wheels resiliently pivot to conform said track to changing terrain contours.

2. A track assembly as set forth in claim 1 wherein each of said plurality of rocker plates longitudinally extends parallel to said framework, wherein each of said plurality of rocker plates includes collinearly aligned first and second idler axle bores and an intermediate pivot bore, wherein each of said plurality of rocker plates includes first and second projections that extend from an edge surface, wherein the elastomer member of each of said plurality of housings is captured between said first and second projections.

3. A track assembly as set forth in claim 2 wherein one of said first and second idler axle bores exhibits a non-circular aperture, and wherein each of said plurality of idler axles includes a non-circular surface shaped to interconnect with said non-circular aperture to prevent an interconnected idler axle from rotating at said rocker plate.

4. A track assembly as set forth in claim 2 wherein first and second wear plates are mounted on opposed sides of each of said elastomer members within each of said housings to pivot about said pivot member.

5. A track assembly as set forth in claim 1 wherein each of said plurality of rocker assemblies supports first and second ones of said plurality of idler axles from one of the plurality of said rocker plates, wherein at least two of said plurality of idler wheels are laterally displaced along each of said first and second ones of said plurality of idler axles, wherein each of said plurality of rocker assemblies includes said housing, wherein one of said plurality of pivot members is mounted to each of said housings, wherein each of said housings contains said elastomer member mounted relative to the one of said plurality of rocker plates to compress and expand with pivoting movements of the one of said plurality of rocker plates.

6. A track assembly as set forth in claim 5 wherein each of said plurality of rocker plates are mounted to longitudinally extend parallel to said framework, wherein each of said plurality of rocker plates includes first and second idler axle bores and an intermediate collinearly aligned pivot bore, wherein each of said plurality of rocker plates includes first and second projections that extend from an edge surface, wherein each elastomer member is captured between said first and second projections, wherein the first and second ones of said plurality of idler axles extend through the first and second idler axle bores, and wherein one of said plurality of pivot members extends through said pivot bore and said housing.

7. A track assembly as set forth in claim 6 wherein first and second wear plates are supported in the housing of each of the plurality of rocker assemblies on opposite sides of each elastomer member to pivot about the one of said plurality of pivot members.

8. A track assembly as set forth in claim 5 wherein first and second wear plates are supported in the housing of each of the plurality of rocker assemblies on opposite sides of each of the elastomer members to pivot with the one of said plurality of rocker plates and said elastomer member about the one of said plurality of pivot members.

9. A track assembly for a vehicle having a chassis, an engine and a plurality of axles, comprising:
a) a track having an interior surface from which a plurality of drive lugs project and an exterior surface from which a plurality of ground lugs project and including a surface region defining a footprint whereat the ground lugs engage the terrain; and
b) a framework including a drive sprocket, a plurality of ramp wheels supported from a plurality of ramp axles at forwardmost and aftmost ends of the framework, a plurality of road wheels supported from a plurality of idler axles laterally coupled in coplanar longitudinal alignment to span said framework intermediate said ramp axles; and
c) a plurality of rocker assemblies coupled to said framework and mounted to pivotally and resiliently support each of said idler axles, wherein each of said rocker assemblies includes, i) a housing, ii) a rocker plate, iii) a pivot member, and iv) an elastomer member, wherein each rocker plate includes first and second idler axle bores and an intermediate, collinearly aligned pivot bore, wherein first and second ones of said plurality of idler axles respectively extend from said first and second idler axle bores, wherein said pivot member is mounted to said pivot bore in coplanar alignment with said first and second ones of said plurality of idler axles, wherein said elastomer member is captured in said housing, wherein said pivot member secures said rocker plate to said housing and supports said rocker plate to pivot relative to said framework and such that said elastomer member compresses and expands as said first and second ones of said plurality of idler axles pivot relative to said framework to resiliently direct said idler wheels to conform the track to changing terrain contours.

10. A track assembly as set forth in claim 9 wherein at least two idler wheels are displaced laterally along each of said plurality of idler axles, wherein first and second ones of said plurality of rocker assemblies are mounted to pivot from laterally opposed sides of said framework, and wherein each of said first and second ones of said rocker assemblies supports said first and second ones of said plurality of idler axles in non-rotative relation to said rocker plate.

11. A track assembly as set forth in claim 9 wherein one of said first and second axle bores exhibits a non-circular aperture and wherein each of said first and second ones of said plurality of idler axles includes a non-circular surface shaped to interconnect with said non-circular aperture to prevent the interconnected one of said first and second ones of said plurality of idler axles from rotating within said rocker plate.

12. A rocker assembly for supporting a plurality of axles and wheels coupled thereto from a framework circumscribed by a track, comprising:
   a) a housing;
   b) a rocker plate;
   c) a pivot member; and
   d) a cushion member comprising an elastomer; and
   e) wherein said rocker plate includes first and second projections, first and second axle bores and an intermediate pivot bore, wherein first and second axles of said plurality of axles extend from said first and second axle bores, wherein said cushion member is captured in said housing between said first and second projections, wherein first and second wear plates are supported in said housing on opposite sides of said cushion member, and wherein said pivot member secures said housing to said rocker plate and supports said rocker plate to pivot relative to said framework and such that said cushion member compresses and expands as said first and second axles pivot relative to said framework to resiliently direct said wheels to conform the track to changing terrain contours.

13. A track assembly as set forth in claim 12 wherein said first and second axle bores and said pivot bore are collinearly aligned and wherein said pivot member and said first and second axles of said plurality of axles are mounted in coplanar alignment in a plane and said plane lies parallel to said framework.

\* \* \* \* \*